United States Patent
Ahlquist (10) Patent No.: US 6,783,150 B2
(45) Date of Patent: Aug. 31, 2004

(54) SNAP TOGETHER MOUNTING OF AN AIR BAG MODULE AND A VEHICLE STEERING WHEEL

(75) Inventor: Steven J. Ahlquist, Fort Gratiot, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 42 days.

(21) Appl. No.: 10/260,589

(22) Filed: Sep. 30, 2002

(65) Prior Publication Data

US 2004/0061317 A1 Apr. 1, 2004

(51) Int. Cl.⁷ .............................................. B60R 21/20
(52) U.S. Cl. .................................... 280/728.2; 280/731
(58) Field of Search .............................. 280/782.2, 731, 280/728.3; 74/552

(56) References Cited

U.S. PATENT DOCUMENTS

| | | | |
|---|---|---|---|
| 5,005,860 A | | 4/1991 | Mori et al. |
| 5,087,069 A | | 2/1992 | Corbett et al. |
| 5,145,207 A | * | 9/1992 | Bederka et al. ............ 280/732 |
| 5,350,190 A | | 9/1994 | Szigethy |
| 5,380,037 A | | 1/1995 | Worrell et al. |
| 5,470,100 A | | 11/1995 | Gordon |
| 5,474,323 A | | 12/1995 | Davidson |
| 5,738,369 A | | 4/1998 | Durrani |
| 5,788,268 A | * | 8/1998 | Goss et al. .............. 280/728.2 |
| 5,794,968 A | * | 8/1998 | Yamamoto et al. ...... 280/728.2 |
| 5,810,535 A | | 9/1998 | Fleckenstein et al. |
| 5,873,596 A | * | 2/1999 | Kantoh et al. .......... 280/728.2 |
| 6,092,832 A | | 7/2000 | Worrell et al. |
| 6,196,573 B1 | | 3/2001 | Worrell et al. |
| 6,237,944 B1 | | 5/2001 | Worrell et al. |
| 6,276,711 B1 | | 8/2001 | Kurz et al. |
| 6,474,682 B2 | * | 11/2002 | Ikeda et al. ................. 280/731 |
| 6,554,312 B2 | * | 4/2003 | Sakane et al. ........... 280/728.2 |
| 6,592,141 B1 | * | 7/2003 | Dancasius et al. ....... 280/728.2 |
| 2001/0005075 A1 | * | 6/2001 | Lorenz .................... 280/728.2 |
| 2002/0043786 A1 | | 4/2002 | Schutz |

FOREIGN PATENT DOCUMENTS

| | | |
|---|---|---|
| DE | 29621295 | 3/1997 |
| EP | 0754600 | 1/1997 |
| EP | 0790153 | 8/1997 |
| EP | 1103429 A1 | 5/2001 |

* cited by examiner

Primary Examiner—David R. Dunn
(74) Attorney, Agent, or Firm—Tarolli, Sundheim, Covell & Tummino L.L.P.

(57) ABSTRACT

An apparatus (10) comprises a support plate (24) having a front surface (34) that is at least partially defined by first and second outer edge portions (26 and 28). Resilient locking members (166 and 182) extend laterally outwardly of the first and second outer edge portions (26 and 28). An air bag module (14) has a base plate portion (110) that is mountable on the support plate (24). The base plate portion (110) includes structure (126 and 134) for deflecting the locking members (166 and 182) laterally inwardly toward the first and second outer edge portions (26 and 28) during movement of the base plate portion (110) toward the front surface (34) of the support plate (24). The locking members (166 and 182) snap laterally outwardly over the structure (126 and 134) of the base plate portion (110) to lock the air bag module (14) on the support plate (24).

16 Claims, 4 Drawing Sheets

SNAP TOGETHER MOUNTING OF AN AIR BAG MODULE AND A VEHICLE STEERING WHEEL

TECHNICAL FIELD

The present invention relates to the mounting of an air bag module on a vehicle steering wheel. More particularly, the present invention relates to a snap together mounting of an air bag module on the hub portion of a vehicle steering wheel.

BACKGROUND OF THE INVENTION

It is known to attach an air bag module to the hub portion of a vehicle steering wheel. A conventional air bag module includes a base plate having a plurality of threaded apertures. Each of the threaded apertures of the base plate corresponds with a through-hole that extends through the hub portion of the steering wheel. To attach the air bag module to the steering wheel, the threaded apertures of the base plate are aligned with the through-holes of the hub portion. Then, threaded fasteners are inserted through the through-holes from the rear of the hub portion and are screwed into the threaded apertures of the base plate of the air bag module. Thus, access to the rear of the steering wheel is required for attaching the air bag module to the steering wheel. Access to the rear of the steering wheel may be limited when the steering wheel is mounted in the vehicle.

To avoid the need for access to the rear of the steering wheel, some current designs for attaching an air bag module to the steering wheel include retainer springs that are attached to the hub portion of the steering wheel. Each retainer spring passes over a rear opening of a through-hole in the hub portion of the steering wheel. Hooked studs are welded to the base plate of the air bag module. Each hooked stud extends rearward from the base plate, i.e., away from the air bag, of the air bag module. When the air bag module is moved toward the hub portion of the steering wheel, the hooked studs pass through associated through-holes in the hub portion of the steering wheel. As the hooked studs exit the rear openings of the associated through-holes, the hooked studs deflect the retainer springs away from the rear openings. When the base plate of the air bag module nears the hub portion of the steering wheel, the retainer springs snap into hooked portions of the hooked studs to lock the air bag module on the hub portion of the steering wheel.

When the air bag module is attached to the hub portion of the steering wheel using the hooked studs, small axial movements of the air bag module relative to the hub portion of the steering wheel are possible. These small axial movements may cause a rattling noise during normal driving operations of the vehicle. Additionally, manufacture of the base plate of the air bag module is labor intensive as the hooked studs must be separately manufactured and attached to the base plate.

SUMMARY OF THE INVENTION

The present invention relates to an apparatus comprising a support plate having a front surface that is at least partially defined by first and second outer edge portions. A first resilient locking member extends laterally outwardly of the first outer edge portion of the support plate and a second resilient locking member extends laterally outwardly of the second outer edge portion of the support plate. An air bag module has a base plate portion that is mountable on the support plate. The base plate portion includes structure for deflecting the first and second locking members laterally inwardly toward the first and second outer edge portions, respectively, during movement of the base plate portion toward the front surface of the support plate. The first and second locking members snap laterally outwardly over the structure of the base plate portion to lock the base plate portion of the air bag module on the support plate.

In accordance with another aspect, the present invention relates to an apparatus comprising a support plate having a front surface that is at least partially defined by first and second outer edge portions. A first resilient locking member extends laterally outwardly of the first outer edge portion of the support plate and a second resilient locking member extends laterally outwardly of the second outer edge portion of the support plate. An air bag module has a base plate portion that is mountable on the support plate. The base plate portion is formed from a single, monolithic piece of material that is not made up of separate pieces secured together. First and second side portions of the single piece of material are bent to form opposite first and second flanges that extend perpendicular to a central base portion. A portion of the first flange is bent toward the second flange portion to form a first locking tab and a portion of the second flange portion is bent toward the first flange to form a second locking tab. The first and second locking tabs of the base plate portion of the air bag module deflect the first and second locking members, respectively, laterally inwardly as the central base portion of the base plate portion is moved toward the front surface of the support plate. The first and second locking members snap between the central base portion and the first and second locking tabs, respectively, to lock the base plate portion of the air bag module on the support plate.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
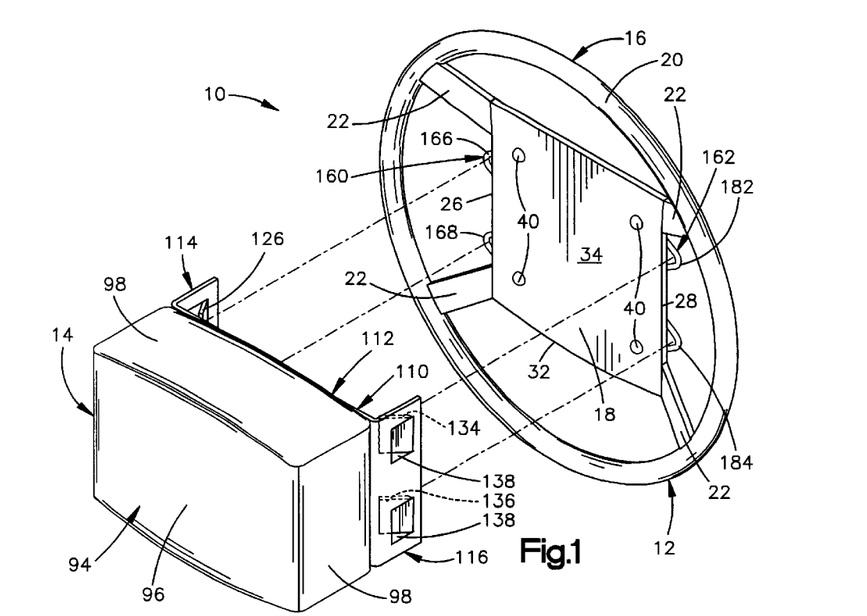
FIG. 1 is an exploded, perspective view of an apparatus constructed in accordance with the present invention.

FIG. 1 is a perspective view of an apparatus 10 constructed in accordance with the present invention. The apparatus 10 includes a steering wheel 12 and an air bag module 14.

The steering wheel 12 includes a steering wheel armature 16. Preferably, the armature 16 is made of a metallic material, such as aluminum or magnesium. The armature 16 includes a hub portion 18, an annular rim portion 20 that extends circumferentially around the hub portion, and a plurality of spokes 22 that connect the rim portion to the hub portion. The armature 16 of the steering wheel 12 illustrated in FIG. 1 includes four spokes 22.

Figure 2:
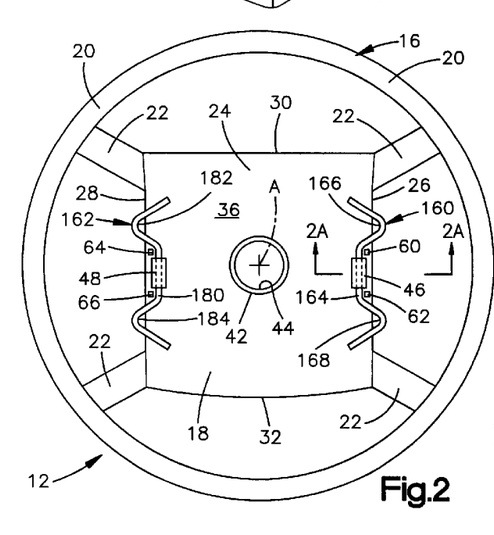
FIG. 2 is a rear view of a steering wheel of the apparatus of FIG. 1.

A rectangular plate 24 forms the hub portion 18 of the steering wheel armature 16 illustrated in FIGS. 1 and 2. The width of the plate 24 of the armature 16 is defined between left and right edges 26 and 28, respectively. The height of the plate 24 is defined between upper and lower edges 30 and 32, respectively.

Figure 4:
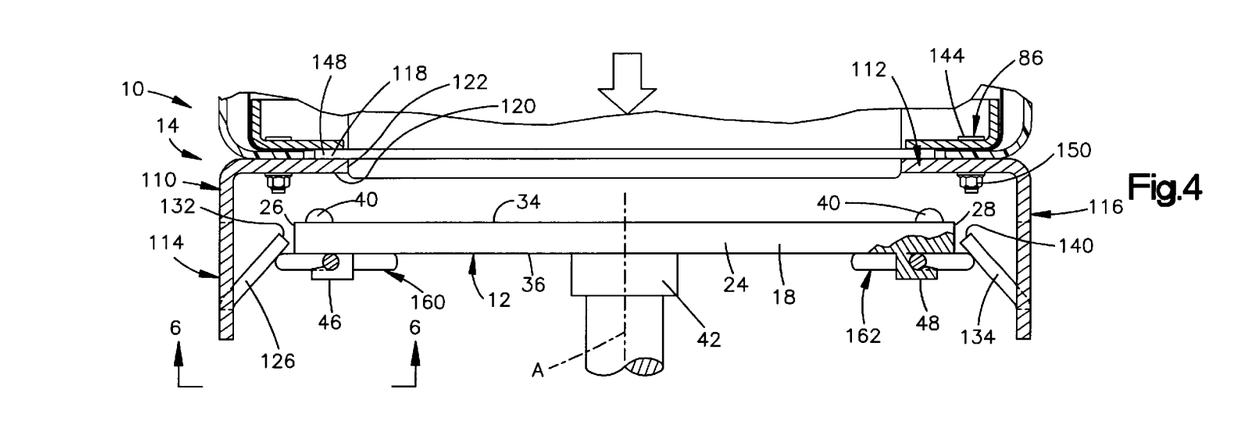
FIG. 4 is a partial cross-sectional view illustrating the air bag module and the armature of the steering wheel during mounting of the air bag module on the steering wheel armature.
Figure 5:
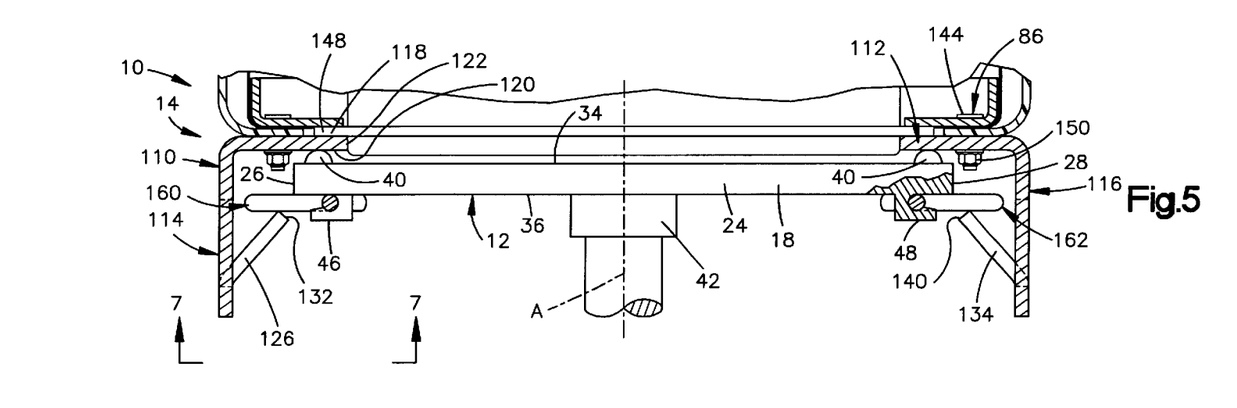
FIG. 5 is a partial cross-sectional view of the air bag module mounted on the steering wheel armature.

The plate 24 includes front and rear surfaces 34 (FIG. 1) and 36 (FIG. 2), respectively. The front surface 34 of the plate 24 faces a vehicle driver when the steering wheel 12 is mounted to a vehicle. Four bumpers 40 are attached to the front surface 34 of the plate 24. The bumpers 40 illustrated in FIGS. 1, 4, and 5 are hemispherical rubber bumpers. When subjected to an axial load, the bumpers 40 compress axially, i.e., along axis A in FIGS. 4 and 5. As an alternative to rubber bumpers 40, other axially compressible biasing members such as coil springs may be used. Preferably, one bumper 40 is located adjacent each corner of the plate 24. The bumpers 40 illustrated in FIG. 1 are adhered to the front surface 34 of the plate 24. Alternatively, each bumper 40 may include a rearward extending stem portion that is inserted into and secured within a hole in the front surface 34 of the plate 24.

FIG. 2 illustrates the rear surface 36 of the plate 24. The rear surface 36 includes a boss 42 for attaching the steering wheel 12 to the steering system of a vehicle. The boss 42 is centrally located on the rear surface 36 of the plate 24. The boss 42 illustrated in FIG. 2 has a generally cylindrical configuration and a splined inner surface 44. The boss 42 may alternatively be polygon shaped for locking with a polygonal portion of the steering system. Axis A defines a center of the boss 42.

Figure 2A:
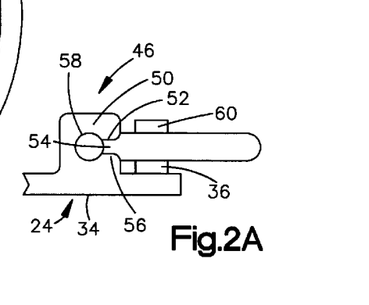
FIG. 2A is a view taken along line 2A—2A in FIG. 2.

Cast into the rear surface 36 of the plate 24 are first and second spring retaining members 46 and 48, respectively. The first spring retaining member 46 is centrally located between the upper and lower edges 30 and 32 of the plate 24 adjacent the left edge 26. FIG. 2A illustrates an enlarged side view of the first spring retaining member 46. The first spring retaining member 46 includes hooked portion 50 that extends rearward from the rear surface 36 of the plate 24 and then turns to extend parallel to the rear surface and toward the left edge 26. The hooked portion 50 includes a lip 52 that extends toward the rear surface 36 of the plate 24 and defines a first side of a passage 54. A protrusion 56 extends rearward from the rear surface 36 of the plate 24 and defines a second surface of the passage 54. The hooked portion 50 and the protrusion 56 collectively define a semi-cylindrical pocket 58 of the first spring retaining member 46. The passage 54 provides access into the pocket 58.

The second spring retaining member 48 is centrally located between upper and lower edges 30 and 32 of the plate 24 adjacent the right edge 28. The second spring retaining member 48 is similar to the first spring retaining member 46 with the exception that a passage into the second spring retaining member 48 is nearer the right edge 28 of the plate 24.

Four protrusions extend outwardly of the rear surface 36 of the plate 24. The first and second protrusions 60 and 62, respectively, are located adjacent the left edge 26 of the plate 24. The first protrusion 60 is located nearer the upper edge 30 of the plate 24 relative to the first spring retaining member 46 and the second protrusion 62 is located nearer the lower edge 32 of the plate relative to the first spring retaining member. The third and fourth protrusions 64 and 66, respectively, are located adjacent the right edge 28 of the plate 24. The third protrusion 64 is located nearer the upper edge 30 of the plate 24 relative to the second spring retaining member 48 and the fourth protrusion 66 is located nearer the lower edge 32 of the plate relative to the second spring retaining member.

Figure 3:
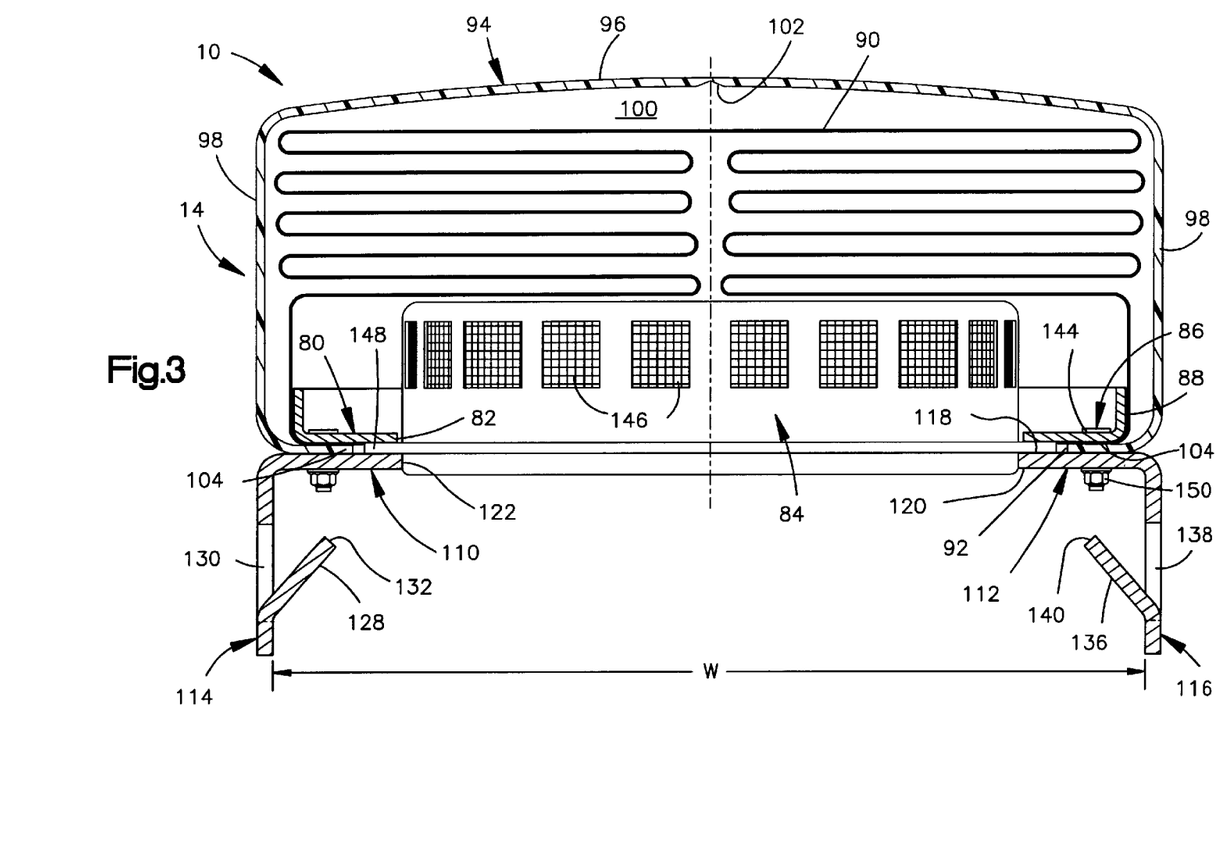
FIG. 3 is a cross-sectional view of an air bag module of the apparatus of FIG. 1.

FIG. 3 is a cross-sectional view of the air bag module 14 of the apparatus 10. The air bag module 14 includes retaining ring 80. The retaining ring 80 has a central aperture 82 for receiving an inflator 84 and a plurality of fastener apertures (not shown), each for receiving a fastener 86. A flange 88 extends upwardly, as viewed in FIG. 3, along the periphery of the retaining ring 80.

The air bag module 14 also includes an air bag 90. FIG. 3 illustrates the air bag 90 in a deflated and folded condition. The air bag 90 includes a mouth portion 92 for receiving inflation fluid. As is known, the inflation fluid inflates the air bag 90. Multiple apertures (not shown) extend through the air bag 90 near the mouth portion 92. The apertures in the air bag 90 align with the apertures in the retaining ring 80 for receiving the fasteners 86.

The air bag module 14 also includes a cover 94. As shown in FIG. 1, the cover 94 includes a front panel 96 and four side panels 98, two of which are shown. The front panel 96 and the side panels 98 of the cover 94 collectively define a compartment 100 (FIG. 3) in which the air bag 90, in the deflated and folded condition, is stored.

The front panel 96 of the cover 94 includes a tear seam 102 (FIG. 3). During inflation of the air bag 90, the front panel 96 ruptures at the tear seam 102 to allow the air bag 90 to deploy outwardly of the compartment 100. Each side panel 98 of the cover 94 includes a flange portion 104, two of which are shown in FIG. 3. The flange portion 104 of each side panel 98 of the cover 94 may be folded perpendicular to the side panel so that the flange portion overlies a portion of the retaining ring 80. Each flange portion 104 includes an aperture that corresponds with a fastener aperture in the retaining ring 80.

The air bag module 14 also includes a base plate 110. The base plate 110 includes a planar base portion 112 and first and second flange portions 114 and 116, respectively. The base portion 112 has a width W, shown in FIG. 3, that is greater than the width of the plate 24 of the hub portion 18 of the steering wheel armature 16 and a height that is approximately equal to the height of the plate of the hub portion of the armature. The base portion 112 of the base plate 110 includes laterally extending front and rear surfaces 118 and 120, respectively.

An inflator aperture 122 extends through the base portion 112 of the base plate 110 for receiving a portion of the inflator 84. The inflator aperture 122 is centered on axis A. A plurality of fastener apertures (not shown) are located laterally outwardly, relative to axis A, from the inflator aperture 122. Each of the fastener apertures in the base portion 112 of the base plate 110 corresponds with an associated fastener aperture in the retaining ring 80, in the mouth portion 92 of the air bag 90, and in the flange portion 104 of a side wall 98 of the cover 94.

Figure 6:
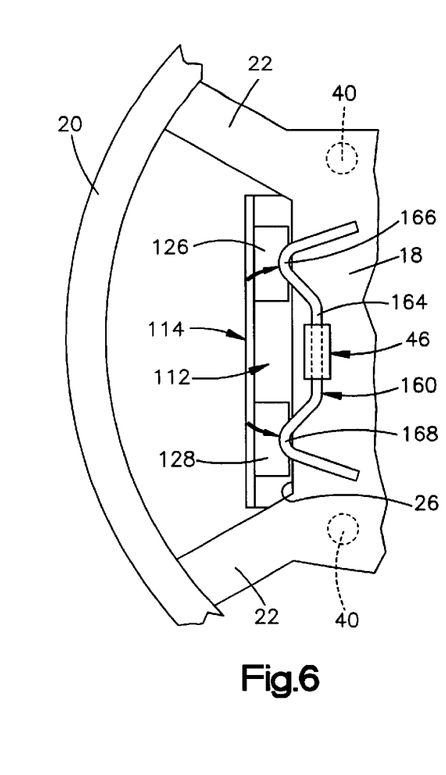
FIG. 6 is a view taken along line 6—6 in FIG. 4.
Figure 7:
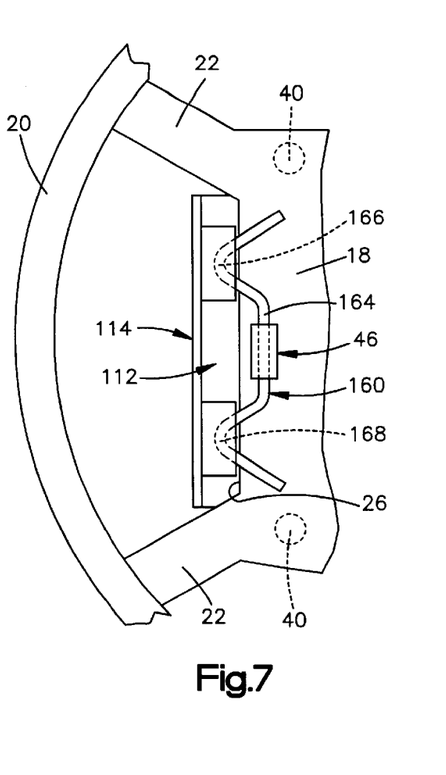
FIG. 7 is a view taken along line 7—7 in FIG. 5.

The first and second flange portions 114 and 116 of the base plate 110 extend axially outwardly relative to the rear surface 120 of the base portion 112. The first flange portion 114 extends along the height of a first edge portion of the base portion 112 of the base plate 110 as best shown in FIGS. 6 and 7. The first flange portion 114 includes first and second locking tabs 126 and 128 (FIG. 6), respectively. As shown in FIGS. 3–5, the first and second locking tabs 126 and 128 extend laterally inwardly toward axis A as the first and second locking tabs extend toward the base portion 112. A rectangular opening 130 is formed in the first flange portion 114 at the location of each of the first and second locking tabs 126 and 128. One rectangular opening 130 is shown in FIG. 3. Each of the first and second locking tabs 126 and 128 terminates at a locking edge 132 that is spaced from the base portion 112 of the base plate 110 by a predetermined distance.

The second flange portion 116 of the base plate 110 is located on an opposite side of the base portion 112 from the first flange portion 114, across the width of the base plate. The second flange portion 116 extends along the height of the base plate and includes third and fourth locking tabs 134 and 136 (FIG. 1), respectively. The third and fourth locking tabs 134 and 136 extend laterally inwardly toward axis A as the third and fourth locking tabs extend toward the base portion 112. A rectangular opening 138 (FIG. 1) is formed in the second flange portion 116 at the location of each of the third and fourth locking tabs 134 and 136. Each of the third and fourth locking tabs 134 and 136 terminates at a locking edge 140 that is spaced from the base portion 112 of the base plate 110 by the predetermined distance.

The base plate 110 is formed from a single piece of material. Preferably, the base plate 110 is stamped from sheet metal. To manufacture the base plate 110, the inflator aperture 122, the fastener apertures, and the locking tabs 126, 128, 134, and 136 are stamped into a planar sheet of the material. The stamping of the locking tabs 126, 128, 134, and 136 cuts the material along three sides that form the rectangular opening 130 or 138 for the respective locking tab. The material of the respective locking tab is then bent away from the plane of the planar sheet of material to form the respective locking tab. Finally, first and second side portions of the sheet of material are bent relative to the remainder of the sheet to form the opposite first and second flange portions 114 and 116 and the central base portion 112.

To assemble the air bag module 14, the retaining ring 80 is inserted into the mouth portion 92 of the air bag 90. The fastener apertures in the mouth portion 92 of the air bag 90 are aligned with the fastener apertures in the retaining ring 80. A fastener 86 is then inserted into each of the aligned fastener apertures of the retaining ring 80 and the air bag 90 such that a head portion 144 of the fastener is located within the air bag.

The air bag 90 is folded and is placed within the compartment 100 of the cover 94. The flange portions 104 of the side panels 98 of the cover 94 are folded laterally inwardly such that each fastener aperture in the flange portions receives a fastener 86. The inflator 84 is then inserted into the inflator aperture 82 of the retaining ring 80. When properly positioned relative to the retaining ring 80, inflation fluid ports 146 (FIG. 3) of the inflator 84 are located within the air bag 90 and the retaining ring 80 supports an annular flange 148 of the inflator 84.

Next, the base plate 110 of the air bag module 14 is attached. The base portion 112 of the base plate 110 is positioned relative to the cover 94 of the partially assembled air bag module such that the first and second flange portions 114 and 116 of the base plate 110 extend away from the cover 94. The base portion 112 of the base plate 110 is moved toward the cover 94 so that each fastener aperture of the base portion receives a fastener 86. When the base portion 112 is properly positioned, the annular flange 148 of the inflator 84 is held between the retaining ring 80 and the base portion 112 of the base plate 110.

A nut 150 (FIG. 3) is screwed onto the threaded shank of each fastener 86 to secure the base plate 110 relative to the retaining ring 80. In the assembled air bag module 14, the air bag 90, the cover 94, and the annular flange 148 of the inflator 84 are held between the retaining ring 80 and the base portion 112 of the base plate 110.

The apparatus 10 also includes first and second spring wire retainers 160 and 162 (FIG. 2), respectively. Preferably, each spring wire retainer 160 and 162 is formed from a resilient metal material.

The first spring wire retainer 160 includes a longitudinally extending central support portion 164 that is interposed between first and second locking portions 166 and 168, respectively. The first locking portion 166 is arcuate. A peak portion of the arcuate first locking portion 166 is spaced laterally relative to the central support portion 164. A first leg portion of the arcuate first locking portion 166 interconnects the peak portion to the central support portion 164. A second leg portion of the arcuate first locking portion 166 terminates at the first end of the first spring wire retainer 160.

The second locking portion 168 of the first spring wire retainer 160 is a mirror image of the first locking portion 166. The second locking portion 168 is arcuate and includes a peak portion that is spaced laterally relative to the central support portion 164. The peak portion of the second locking portion 168 aligns longitudinally with the peak portion of the first locking portion 166. A first leg portion of the arcuate second locking portion 168 interconnects the peak portion to the central support portion 164. A second leg portion of the arcuate second locking portion 168 terminates at the second end of the first spring wire retainer 160.

The second spring wire retainer 162 is similar to the first spring wire retainer 160. The second spring wire retainer 162 includes a longitudinally extending central support portion 180 that is interposed between first and second locking portions 182 and 184, respectively. The first locking portion 182 is arcuate. A peak portion of the arcuate first locking portion 182 is spaced laterally relative to the central support portion 180. A first leg portion of the arcuate first locking portion 182 interconnects the peak portion to the central support portion 180. A second leg portion of the arcuate first locking portion 182 terminates at the first end of the second spring wire retainer 162.

The second locking portion 184 of the second spring wire retainer 162 is a mirror image of the first locking portion 182. The second locking portion 184 is arcuate and includes a peak portion that is spaced laterally relative to the central support portion 180. The peak portion of the second locking portion 184 aligns longitudinally with the peak portion of the first locking portion 182. A first leg portion of the arcuate second locking portion 184 interconnects the peak portion to the central support portion 180. A second leg portion of the arcuate second locking portion 184 terminates at the second end of the second spring wire retainer 162.

The first spring retaining member 46 of the plate 24 of the hub portion 18 of the steering wheel armature 16 supports the first spring wire retainer 160 relative to the left edge 26 of the plate 24. To position the first spring wire retainer 160 within the first spring retaining member 46, the central support portion 164 of the first spring wire retainer 160 is aligned with passage 54 of the first spring retaining member 46. Then, the central support portion 164 of the first spring wire retainer 160 is pushed through the passage 54 and into the pocket 58 of the first spring retaining member 46.

When seated in the pocket 58 of the first spring retaining member 46, the central support portion 164 of the first spring wire retainer 160 extends adjacent to the first and second protrusions 60 and 62 of the plate 24. The first locking portion 166 of the first spring wire retainer 160 extends laterally outwardly of the left edge 26 of the plate 24. The second locking portion 168 of the first spring wire retainer 160 also extends laterally outwardly of the left edge 26 of the plate 24.

The second spring retaining member 48 of the plate 24 supports the second spring wire retainer 162 relative to the right edge 28 of the plate 24. To position the second spring wire retainer 162 within the second spring retaining member 48, the central support portion 180 of the second spring wire retainer 162 is aligned with a passage of the second spring retaining member 48. Then, the central support portion 180 of the second spring wire retainer 162 is pushed through the passage and into a pocket of the second spring retaining member 48.

When seated in the pocket of the second spring retaining member 48, the central support portion 180 of the second spring wire retainer 162 extends adjacent to the third and fourth protrusions 64 and 66 of the plate 24. The first locking portion 182 of the second spring wire retainer 162 extends laterally outwardly of the right edge 28 of the plate 24. The second locking portion 184 of the second spring wire retainer 162 also extends laterally outwardly of the right edge 28 of the plate 24.

To mount the air bag module 14 on the plate 24 of the hub portion 18 of the steering wheel armature 16, the assembled air bag module 14 is positioned relative to the plate 24 so that the first and second flange portions 114 and 116 of the base plate 110 of the air bag module 14 are positioned adjacent the left and right edges 26 and 28, respectively, of the plate 24. The air bag module 14 is then moved toward the hub portion 18 of the steering wheel 12 so that the base portion 112 of the base plate 110 approaches the front surface 34 of the plate 24 of the hub portion 18 of the steering wheel armature 16. During movement of the air bag module 14 toward the hub portion 18, the first and second locking tabs 126 and 128 of the first flange portion 114 contact the first and second locking portions 166 and 168, respectively, of the first spring wire retainer 160 and deflect the first and second locking portions 166 and 168 laterally inwardly. FIGS. 4 and 6 illustrate the first and second locking tabs 126 and 128 deflecting the first and second locking portions 166 and 168, respectively, of the first spring wire retainer 160 laterally inwardly during movement of the air bag module 14 onto the hub portion 18 of the steering wheel 12.

Likewise, during movement of the air bag module 14 toward the hub portion 18, the third and fourth locking tabs 134 and 136 of the second flange portion 116 contact the first and second locking portions 182 and 184, respectively, of the second spring wire retainer 162 and deflect the first and second locking portions 182 and 184 laterally inwardly.

As the base portion 112 of the base plate 110 of the air bag module 14 begins to make contact with the compressible bumpers 40, the locking portions 166, 168, 182, and 184 of the first and second spring wire retainers 160 and 162 near the locking edges 132 and 140 of the respective locking tabs 126, 128, 134, and 136. When the air bag module 14 is pressed toward the hub portion 112 of the steering wheel 12 such that the base portion 112 of the base plate 110 axially compresses the bumpers 40, the locking edges 132 and 140 of the respective locking tabs 126, 128, 134, and 136 extend below the locking portions 166, 168, 182, and 184 of the first and second spring wire retainers 160 and 162. As a result, the locking portions 166, 168, 182, and 184 of the first and second spring wire retainers 160 and 162 snap back into their original positions to lock the air bag module 14 on the hub portion 18 of the steering wheel 12. FIGS. 5 and 7 illustrate the position of the first and second locking portions 166 and 168 of the first spring wire retainer 160 relative to the locking tabs 126 and 128 of the first flange portion 114 when the air bag module 14 is locked on the hub portion 18 of the steering wheel 12.

When the air bag module 14 is mounted on the hub portion 18, the bumpers 40 apply a force to the base portion 112 of the base plate 110 of the air bag module 14. This force causes the locking edges 132 and 140 of the locking tabs 126, 128, 134, and 136 to contact the locking portions 166, 168, 182, and 184 of the respective spring wire retainers 160 and 162. As a result, the bumpers 40 prevent axial movement of the air bag module 14 relative to the hub portion 18 of the steering wheel 12. Thus, rattle between the air bag module 14 and the hub portion 18 of the steering wheel 12 is prevented.

If desired, the air bag module 14 is removable from the hub portion 18 of the steering wheel 12. To remove the air bag module 14, a head portion of a flat head screwdriver (not shown) is positioned between the first protrusion 60 of the plate 24 and the first spring wire retainer 160. Turning of the screwdriver deflects the first locking portion 166 of the first spring wire retainer 160 laterally inwardly and allows the air bag module 14 to be pulled axially outwardly so that the first locking portion 166 no longer snaps over the first locking tab 126. This procedure is repeated at the second, third, and fourth protrusions 62, 64, and 66 to allow removal of the air bag module 14 from the steering wheel 12.

Figure 8:
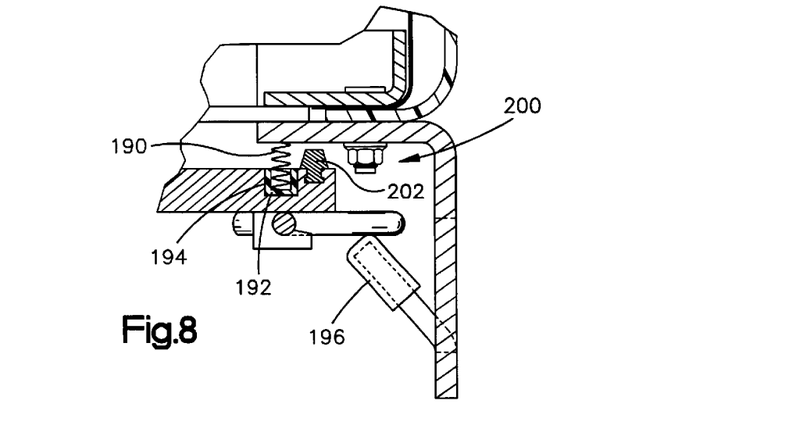
FIG. 8 is a cross-sectional view illustrating an air bag module mounted on a steering wheel armature in accordance with a second embodiment of the present invention.

FIG. 8 is a cross-sectional view illustrating an air bag module 14 mounted on a steering wheel 12 in accordance with a second embodiment of the present invention. Structures having the same or similar construction to those of FIG. 3 will be indicated using the same reference numbers.

The apparatus of FIG. 8 includes coil springs 190 for biasing the base plate 110 of the air bag module 14 away from the front surface 34 of the plate 24 of the hub portion 18 of the steering wheel armature 16. The coil springs 190 seat against a plastic seat 192 that is held in an associated blind hole 194 in the front surface 34 of the plate 24. The plastic seat 192 electrically insulates the plate 24 from the coil spring 190 and thus, from the base plate 110 of the air bag module 14. Additionally, each locking tab 126, 128, 134, and 136 of the base plate 110 includes a plastic sleeve 196 for electrically insulating the base plate 110 from the first and second spring wire retainers 160 and 162. Those skilled in the art will recognize alternative structure and methods for electrically isolating the base plate 110 from the plate 24.

The apparatus 10 of FIG. 8 includes a floating horn switch 200. The floating horn switch 200 includes a plurality of first electrical contacts 202, two of which are shown in FIG. 8, that extend outwardly of the front surface 34 of the plate 24. The base plate 110 of the air bag module 14 forms a second electrical contact of the floating horn switch 200. The coil springs 190 bias the base plate 110 away from the first electrical contacts 202 on the plate 24. When the air bag module 14 is pushed axially toward the plate 24, the first and second electrical contacts are brought into engagement and the floating horn switch 200 closes.

From the above description of the invention, those skilled in the art will perceive improvements, changes and modifications. For example, a single spring wire retainer may be used to form the locking portions 166, 168, 182, and 184 that extend outwardly of the left and right edges 26 and 28 of the plate 24 of the hub portion 18 of the steering wheel armature 16. Such improvements, changes and modifications within the skill of the art are intended to be covered by the appended claims.

Having described the invention, I claim the following:

1. An apparatus comprising:
   a support plate having a front surface that is at least partially defined by first and second outer edge portions;
   a first resilient locking member extending laterally outwardly of the first outer edge portion of the support plate and a second resilient locking member extending laterally outwardly of the second outer edge portion of the support plate; and
   an air bag module having a base plate portion that is mountable on the support plate, the base plate portion including structure for deflecting the first and second locking members laterally inwardly toward the first and second outer edge portions, respectively, during movement of the base plate portion toward the front surface of the support plate,
   the first and second locking members snapping laterally outwardly over the structure of the base plate portion to lock the base plate portion of the air bag module on the support plate.

2. The apparatus of claim 1 wherein the support plate forms a hub portion of a vehicle steering wheel.

3. The apparatus of claim 1 wherein a plurality of axially compressible biasing members are attached to the front surface of the support plate and extend axially outwardly of the front surface of the support plate,
   the first and second locking members snapping laterally outwardly over the structure of the base plate portion to lock the base plate portion of the air bag module on the support plate in response to the base plate portion contacting the axially compressible biasing members and axially compressing the axially compressible biasing members by a predetermined amount.

4. The apparatus of claim 1 wherein the structure of the base plate portion includes first and second flanges, the first and second flanges extending perpendicularly from opposite edges of a central base portion of the base plate portion, the first flange including a first locking portion for interlocking with the first locking member and the second flange including a second locking portion for interlocking with the second locking member.

5. The apparatus of claim 4 wherein the base plate portion is formed from a single, monolithic piece of material that is not made up of separate pieces secured together, the single piece of material being bent to form the central base portion and the first and second flanges.

6. The apparatus of claim 4 wherein the first locking portion of the first flange is formed from an inwardly bent portion of the first flange and wherein the second locking portion of the second flange is formed from an inwardly bent portion of the second flange.

7. The apparatus of claim 6 wherein a first rectangular aperture is formed in the first flange by the inwardly bent first locking portion and wherein a second rectangular aperture is formed in the second flange by the inwardly bent second locking portion.

8. The apparatus of claim 1 wherein the first locking member forms a first end portion of a first spring retainer and wherein a third locking member forms a second end of the first spring retainer, a central portion of the first spring retainer being supported relative to the first outer edge portion of the support plate and wherein the second locking member forms a first end portion of a second spring retainer and wherein a fourth locking member forms a second end of the second spring retainer, a central portion of the second spring retainer being supported relative to the second outer edge portion of the support plate.

9. The apparatus of claim 3 wherein the axially compressible biasing members, when the air bag module is mounted on the support plate, bias the base plate portion away from the front surface of the support plate and bias the structure of the base plate portion against the first and second locking members.

10. The apparatus of claim 9 wherein the base plate portion of the air bag module is electrically insulated from the support plate, the base plate portion including a first electrical contact of a floating horn switch and the front surface of the support plate including a second electrical contact of the floating horn switch, axial movement of the base plate portion against the bias of the axially compressible biasing members and toward the front surface of the support plate bringing the first and second electrical contacts into engagement and closing the floating horn switch.

11. An apparatus comprising:
    a support plate having a front surface that is at least partially defined by first and second outer edge portions;
    a first resilient locking member extending laterally outwardly of the first outer edge portion of the support plate and a second resilient locking member extending laterally outwardly of the second outer edge portion of the support plate; and
    an air bag module having a base plate portion that is mountable on the support plate, the base plate portion being formed from a single, monolithic piece of material that is not made up of separate pieces secured together, first and second side portions of the single piece of material being bent to form opposite first and second flanges that extend perpendicular to a central base portion, a portion of the first flange being bent toward the second flange to form a first locking tab and a portion of the second flange being bent toward the first flange to form a second locking tab,
    the first and second locking tabs of the base plate portion of the air bag module deflecting the first and second locking members, respectively, laterally inwardly as the central base portion of the base plate portion is moved toward the front surface of the support plate, the first and second locking members snapping between the central base portion and the first and second locking tabs, respectively, to lock the base plate portion of the air bag module on the support plate.

12. The apparatus of claim 11 wherein the support plate forms a hub portion of a vehicle steering wheel.

13. The apparatus of claim 11 wherein a first rectangular aperture is formed in the first flange by the first locking tab and wherein a second rectangular aperture is formed in the second flange by the second locking tab.

14. The apparatus of claim 11 wherein the first locking member forms a first end portion of a first spring retainer and wherein a third locking member forms a second end of the first spring retainer, a central portion of the first spring retainer being supported relative to the first outer edge portion of the support plate and wherein the second locking member forms a first end portion of a second spring retainer and wherein a fourth locking member forms a second end of the second spring retainer, a central portion of the second spring retainer being supported relative to the second outer edge portion of the support plate.

15. The apparatus of claim 11 further including a plurality of axially compressible biasing members, the axially compressible biasing members being attached to the front surface of the support plate and extending axially outwardly of the front surface for biasing the central base portion of the base plate portion away from the front surface of the support plate and for biasing the first and second locking tabs of the base plate portion against the first and second locking members, respectively.

16. The apparatus of claim 15 wherein the base plate portion of the air bag module is electrically insulated from the support plate, the base plate portion including a first electrical contact of a floating horn switch and the front surface of the support plate including a second electrical contact of the floating horn switch, axial movement of the base plate portion against the bias of the axially compressible biasing members and toward the front surface of the support plate bringing the first and second electrical contacts into engagement and closing the floating horn switch.

* * * * *